United States Patent [19]

Goode et al.

[11] Patent Number: 4,668,271

[45] Date of Patent: May 26, 1987

[54] ABLATION MELTING WITH THERMAL PROTECTION

[75] Inventors: Henry C. Goode, Decatur, Ill.; Gary N. Hughes, Pittsburgh; Donald P. Michelotti, Gibsonia, both of Pa.

[73] Assignee: PPG Industries, Inc., Pittsburgh, Pa.

[21] Appl. No.: 815,700

[22] Filed: Jan. 2, 1986

[51] Int. Cl.⁴ .............................................. C03B 5/235
[52] U.S. Cl. ........................................ 65/137; 65/136; 65/335; 65/337; 65/347; 432/189; 432/196
[58] Field of Search ................. 65/136, 335, 137, 337, 65/347, 356; 432/189, 196

[56] References Cited

U.S. PATENT DOCUMENTS

| 2,834,157 | 5/1958 | Bowes | 13/6 |
| 3,689,679 | 9/1972 | Niwa et al. | 13/6 |
| 3,917,479 | 11/1975 | Sayce et al. | 75/10 |
| 4,061,487 | 12/1977 | Kiyonaga | 65/135 |
| 4,381,934 | 5/1983 | Kunkle et al. | 65/135 |

Primary Examiner—Arthur Kellogg
Attorney, Agent, or Firm—Dennis G. Millman

[57] ABSTRACT

In a method and apparatus for liquefying material such as glass batch, primary thermal protection for the vessel is provided by a lining of the batch material, with secondary protection being provided by forced cooling of a minor portion of the vessel in regions and at times when the primary protection is irregular.

17 Claims, 1 Drawing Figure

U.S. Patent  May 26, 1987  4,668,271
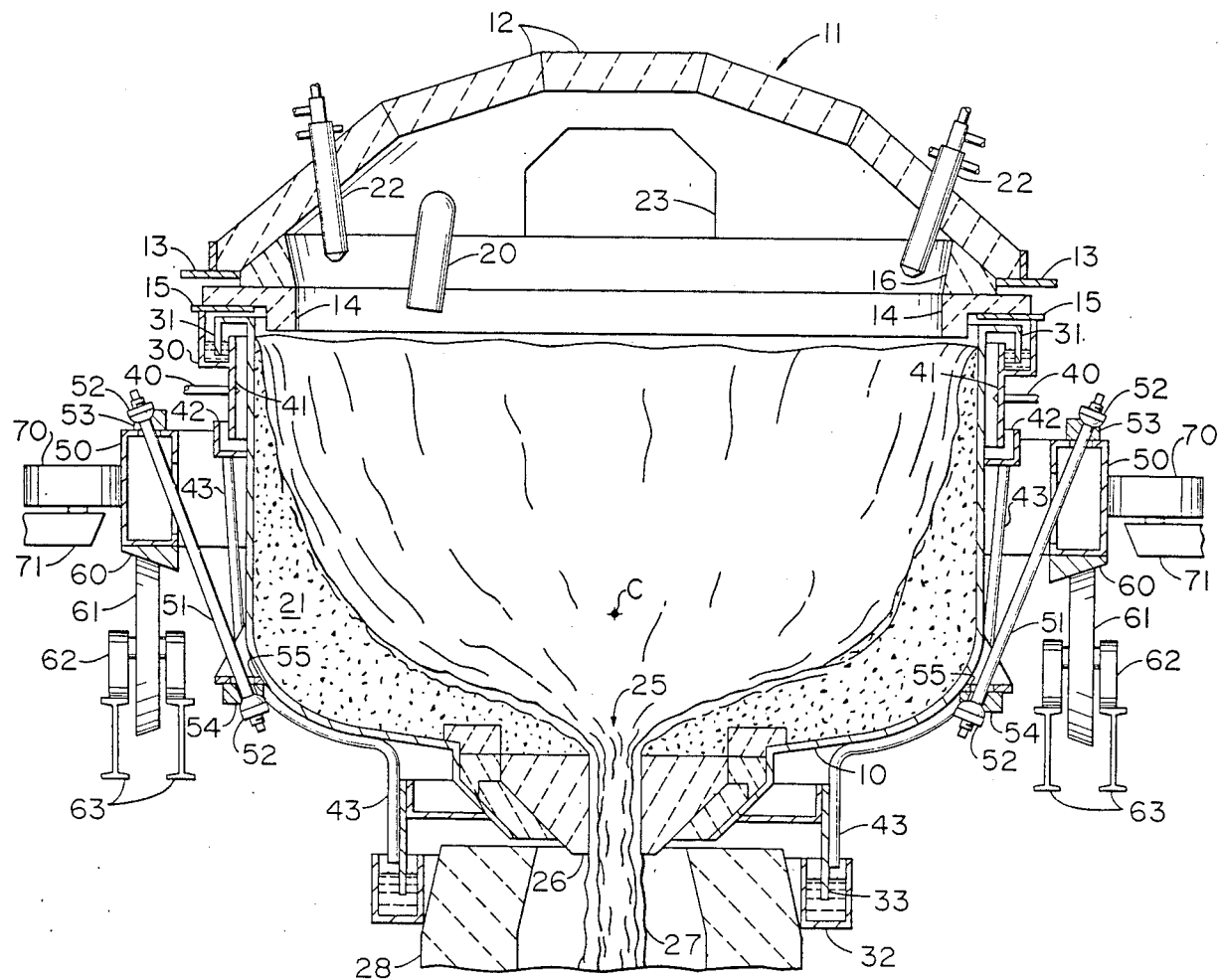

4,668,271

ABLATION MELTING WITH THERMAL PROTECTION

BACKGROUND OF THE INVENTION

In U.S. Pat. No. 4,381,934 there is disclosed a method for liquefying materials such as glass batch or the like, wherein a lining of pulverulent material such as the batch material itself acts as insulation to protect the vessel side walls from the intense temperatures within the vessel. In preferred embodiments, the lining encircles a central cavity of the vessel and the lining is maintained by permitting liquefied material to flow freely from the vessel and by feeding relatively cool material onto the lining. An advantage of such an arrangement is that high temperatures can be provided for liquefying the batch without requiring extensive contact of the product stream with contaminating refractory materials and without requiring extensive heat loss by forced cooling of the vessel walls.

Prior art examples of water cooled melting vessels are disclosed in U.S. Pat. Nos. 2,834,157 (Bowes), 3,917,479 (Sayce et al.), and 4,061,487 (Kiyonaga). Each of these employs water cooling as the primary agent to preserve substantially the entire side wall portions of the vessel, with the result that a large amount of energy is wasted through the vessel walls due to the large temperature gradient established between the cooling fluid and the molten material within the vessel.

The liquefying method of the aforesaid U.S. Pat. No. 4,381,934 is capable of continuous operation over extended periods of time without the use of forced external cooling while avoiding significant thermal deterioration of the vessel side walls. Although the lining of batch material may at times erode irregularly, the system is generally self-repairing due to the feeding of additional batch material to the vessel. However, disruptions in the steady state conditions within the liquefaction vessel may occasionally result in reduction in thickness of portions of the lining, particularly in the upper portion of the vessel, to the extent that portions of the vessel side walls may be exposed to temperatures which, if sustained for a sufficient period of time, could lead to distortion or other thermal deterioration of the vessel. Instability of the batch wall thickness can occur, for example, during startup or when changing the batch feed rate or the heating rate. Also, during normal operation the batch lining at a middle elevation may erode more rapidly, thereby undercutting the lining above, and eventually causing a sudden collapse of lining from an upper region. Such aberrations do not present a significant problem if they are short in duration, but if they are sustained or occur frequently, it would be desirable to provide thermal protection for the vessel. Thermal distortion of the vessel is particularly a problem because of the dynamic instability it produces when the vessel is rotated in accordance with the preferred embodiments of the liquefaction process.

U.S. Pat. No. 3,689,679 (Niwa et al.) discloses a silica melting process of a somewhat different type in which portions of the vessel are cooled. As depicted in the patent, cooling is provided on a majority of the side wall area in the region of active melting. The patent does not involve liquefying at the surface of a lining as in the present invention.

SUMMARY OF THE INVENTION

In the present invention, batch materials for glass or the like are liquefied on a surface of a cavity within a vessel for which the primary thermal protection is provided by an insulating lining of pulverulent material compatible with the material being liquefied, preferably the batch material itself. To protect the vessel side walls against undue thermal deterioration in the event that the lining thickness is excessively reduced during irregular operation, a minor, upper portion of the vessel is provided with exterior, forced cooling. Heat lost by this cooling is insubstantial because of the relatively small area of the vessel to which it is applied, and because in most circumstances it would be in effect only intermittently. Significant heat transfer takes place only in those areas from which the lining has been almost completely lost. This may be confined not only to a narrow band at the top of the vessel, but also, at times, to only portions of this band around the periphery. Additionally, since exposure of the bare vessel to the heat may occur only intermittently, permitting the material of the vessel to briefly experience temperatures at or near the upper limit of recommended operating temperature ranges may not be significantly detrimental, and thus only a moderate amount of cooling need be applied. The cooling may be utilized continuously to provide assurance against any undetected disruptions in the lining integrity. When a significant lining thickness is present, very little heat loss results from employing the cooling because the batch lining is a good insulator. Alternatively, the cooling may be operated only when the lining is unstable.

THE DRAWING

The drawing is a vertical cross-sectional view of a preferred embodiment of a rotating liquefaction vessel including cooling means at the upper side wall portion in accordance with the present invention.

DETAILED DESCRIPTION

Referring to the specific embodiment shown in the figure, the basic structure of the liquefying vessel is a drum 10 which may be fabricated of steel and which has a generally cylindrical side configuration, a generally open top, and a bottom portion that is closed except for a drain outlet. The drum 10 is mounted for rotation about a vertical axis in a manner to be described in detail hereinbelow. A substantially enclosed cavity is formed within the liquefying vessel by means of a lid structure generally designated as 11 which is provided with stationary support. The lid 11 is preferably constructed of refractory ceramic material and may take a variety of forms as would be known to those of skill in the refractory furnace construction art. The preferred arrangement depicted in the figure is an upwardly domed, sprung arch construction fabricated from a plurality of refractory blocks 12. In the typical arch construction shown, the arch blocks rest on a peripheral support structure 13. Plate blocks 14 may extend slightly below the upper rim of the drum 10 and are supported by stationary support plate 15. Seal blocks 16 may be provided to close the gap between the arch blocks 12 and the plate blocks 14. It should be understood that monolithic and flat suspended designs could be employed for the lid.

Batch materials, preferably in a pulverulent state, may be fed into the cavity of the heating vessel by means of a water cooled chute 20. A layer 21 of the batch material is retained on the interior walls of the drum 10 to act as an insulating lining. As the drum is rotating, the feed chute 20 directs batch material onto upper portions of the lining 21. Heating for liquefying the batch material may be provided by one or more burners 22 extending through the lid 11. Preferably a plurality of burners 22 are arranged around the perimeter of the lid so as to direct their flames toward a wide area of the lining 21. The burners are preferably water cooled to protect them from the harsh environment within the vessel. Exhaust gases escape from the vessel through an opening 23 in lid 11. As batch material on the surface of lining 21 liquefies it flows down the sloped lining to a central drain opening 25 at the bottom of the vessel. The opening 25 may be fitted with a refractory ceramic bushing 26. A stream of liquefied material 27 falls freely from the vessel into a stationary receptacle 28 and may thereafter be subjected to additional treatment to complete the melting process. Because the liquefied material is permitted to flow freely from the surface of the lining 21, it is in an incompletely melted state as it passes from the drum 10. Liquefied glass batch at that point usually includes a large amount of gaseous products of reaction and may also include some unmelted particles.

At the interface between the upper rim of the rotating drum 10 and the stationary lid 11 an atmosphere seal may be provided comprised of a stationary, circular, water-containing trough and a circular flange member 31 extending downwardly into the trough from the rotating drum. A similar stationary water trough 32 and flange 33 extending downwardly from the rotating drum may be provided at the lower end of the drum. Other types of sealing arrangements could be employed at these locations.

Various arrangements could be employed to provide forced cooling to the upper portion of the drum 10. The coolant could be liquid (e.g., water) or gaseous (e.g., air). In the example shown, a stream of water is sprayed against the exterior of the upper portion of the drum. The water spray may be supplied with water by way of conduits 40, and the spray may be confined to the space closely adjacent to the drum by means of a spray shield 41. Spent water may be collected in a circular trough 42 and drained by way of conduits 43 that extend down along the slides of and rotate with the drum 10. Discharge of water from the conduits 43 may conveniently be provided into the water trough 32 of the bottom atmosphere seal.

The external cooling need be applied only to the limited area of the side wall most prone to failure of the inner lining. In most cases, this would be a minor, upper portion of the drum corresponding to less than half of the height of the drum, preferably only the upper one-fourth. However, the inner lining 21 normally serves as the primary thermal protection for the majority of the area of the drum side walls. Applying external cooling to a portion of the drum that is protected by an intact lining will extract very little thermal energy from the heating process being carried out within the drum. Therefore, the cooled area may be larger than necessary with little or no loss of thermal efficiency, since significant heat transfer through the drum wall will take place only in areas where the lining has been reduced below the minimum for effective protection of the drum. A layer of pulverulent glass batch material on the order of at least 2 centimeters thick has been found to be an effective insulator, and even at smaller thicknesses very little heat transfer occurs through the batch layer. Only at times when nearly bare metal is exposed to the interior heat is any significant heat transferred to the coolant. On those occasions, structural stability of the vessel is assured by the cooling, with only temporary heat loss in a minor area. As soon as possible after such a lining failure, the batch feeding rate and/or firing rate are adjusted to restore the lining to an effective insulating thickness. The cooling could be discontinued at that time, but there can be some advantage to continuing the flow of coolant because little heat transfer occurs, and maintaining the exterior of the vessel at the coolant temperature can avoid thermal shock when cooling is resumed.

The base on which the drum 10 is rotatably supported and driven is a support table 50 which, as shown in the drawing, may be configured as a hollow ring of generally rectangular cross-section. The support ring 50 encircles the drum and is spaced therefrom. The link means for connecting the support ring 50 to the drum 10 in this embodiment comprise a plurality of support rods 51. The number and size of the rods 51 are inversely related and depend upon the weight of a particular drum when fully loaded. Three rods could theoretically support the drum, but the use of four or more (preferably eight or more) rods permits a bicycle spoke type of arrangement to be employed whereby rotation of the drum 10 relative to the ring 50 is counteracted. In such an arrangement the rods do not lie in radial planes of the drum, but rather extend along vertical planes that do not intersect the vertical axis of the drum, with the planes of adjacent rods passing on opposite sides of the vertical axis of the drum. With larger vessels the number of rods may be increased accordingly in order to distribute the load, and it is contemplated that the number of rods may be on the order of twenty-four in an embodiment of the type shown in the drawing. Rods are the preferred form of link means because they provide little obstruction to the sides of the drum, thereby permitting access for construction and maintenance, providing free circulation of air, and avoiding accumulation of any spilled materials.

The rods 51 are held in place at each end by spherical ended nuts 52 which are, in turn, received in concave sockets in upper and lower support blocks 53 and 54 respectively. The upper support blocks 53 are mounted on the support ring 50 at an elevation above the center of gravity "C" of the loaded vessel in accordance with one aspect of the present invention. The lower support blocks 54 are affixed to a peripheral ring 55 or the like, which is attached to the drum 10 at an elevation substantially lower than the elevation of the upper support blocks 53. The extent to which the elevation at which the upper ends of the support rods 51 engage the support ring 50 exceeds the elevation of the center of gravity "C" is preferably maximized in order to optimize the self-centering affects. However, any significant elevation difference therebetween would achieve some degree of the self-centering advantage of the present invention. Practical consideration will, in most cases, restrict the elevation of the upper level of engagement. Structural support means for the stationary lid 11 and other appurtenances associated with the lid and the interface of the lid with the drum would typically interfere with any attempt to extend the rotating drum support elements above the uppermost elevation of the drum. Because the lining material 21 tapers to a greater thickness at the bottom of a cylindrical drum as shown in the drawing, the center of gravity will usually be within the lower half of the height of the drum. Accordingly, the elevation of support may alternatively be expressed as being at the upper half of the height of the drum.

Attachment of the link means such as rods 51 to the drum preferably is located at a region of the drum that is relatively cool and therefore less susceptible to thermal warpage. The thickening of the lining 21 toward the bottom of the cylindrical drum renders lower portions of the drum more desirable for the attachment locations. Although attachment at the upper half of the drum may sometimes be acceptable, it is preferred to make the attachment at the lower half. In the most preferred arrangement, the attachment is at or below the elevation of the center of gravity "C" of the vessel loaded with a normal amount of material including the lining.

The vessel 10, instead of the generally cylindrical shape shown may be provided with other shapes such as a downwardly converging frustoconical shape or a stepped shape as shown in U.S. Pat. No. 4,496,387 (Heithoff et al.). In such cases, the center of gravity may not lie within the lower half of the vessel, but the preferred elevation of support would be above the center of gravity, and the elevation of attachment to the vessel would be at the lower half.

The underside of the support ring 50 is provided with a tapered track 60 that makes rolling contact with a plurality of tapered wheels 61. The wheels 61 are rotatably carried by bearings 62 that are affixed to suitable stationary structural members such as beams 63. The wheels 61 carry the vertical load of the drum and its contents, and the number of wheels should be chosen accordingly to distribute the load, eight wheels being considered suitable in a typical commercial scale installation as shown in the drawing. The contact surface of the track 60 tapers downwardly toward the drum 10, thus being configured as a segment of a cone.

Lateral restraint is applied to the rotating drum 10 and support ring 50 by means of a plurality of wheels 70 bearing against the periphery of the support ring 50. The lateral restraint wheels 70 may be rotatably carried on rigid support means 71, which may be adjustable in the radial direction with respect to the drum 10. At least three lateral restraint wheels 70 are provided, and the wheels 70 are preferably pneumatic tires. At least one of the wheels 70 is driven by means of a motor (not shown) so as to rotate the support table 50 and thus the drum 10. Rather than serving as absolute restraint for the rotating elements, the wheels 70 serve to dampen any oscillation or reciprocation of the drum axis from its intended locus. The wheels 70 damp any horizontal movement of the drum and support ring, while the conical interface between the track 60 and vertical support wheels 61 provides the primary centering force. Likewise, the decay of oscillatory motion of the drum axis by virtue of the support being at an elevation above the center of gravity is aided by the damping effect of the wheels 70.

It should be evident that other variations and modifications as would be known to those of skill in the art, may be resorted to without departing from the scope of the invention as defined by the claims which follow.

The invention has been described in connection with liquefaction of glass batch, for which the invention is particularly useful. This includes flat glass, fiber glass, container glass, sodium silicate, and virtually any type of specialty glass. The invention is also applicable to liquefying other materials such as metallurgical ores or other glassy or ceramic materials that may not be strictly defined as "glasses." It may also be noted that while the preferred practice is to employ compositions that are substantially identical chemically for the throughput batch and the liquefying vessel lining, particularly when processing flat glass, some variation therebetween can be considered non-contaminating and thus unobjectionable in some cases.

We claim:

1. A method of liquefying thermally fusible material comprising:

feeding pulverulent batch material to a cavity encircled by a lining of pulverulent material on interior side wall portions of a vessel, the lining sloping from a relatively thin upper portion to a relatively thick lower portion;

providing heat to the cavity to partially liquefy exposed portions of the pulverulent material, and permitting the partially liquefied material to flow from the vessel;

protecting a major portion of the vessel side wall against undue thermal deterioration substantially solely by maintaining sufficient lining thickness to insulate that portion of the vessel from the heat within the cavity, the pulverulent lining thickness being maintained by controlling the rate of heating and the rate of feeding additional pulverulent material; and at a minor upper portion of the vessel side wall where pulverulent lining thickness is not sufficient to adequately insulate the vessel, preserving the minor portion of the vessel by forced cooling of side wall portions.

2. The method of claim 1 wherein the cooling of side wall portions includes directing water into contact with the exterior surface of the side wall portions.

3. The method of claim 1 wherein the side wall portions that are cooled comprise less than half of the side wall.

4. The method of claim 3 wherein the side wall portions that are cooled are adjacent to the end of the vessel at which the pulverulent material is fed into the vessel.

5. The method of claim 1 wherein the cooling of side wall portions includes directing a stream of coolant fluid toward the exterior surface of the side wall.

6. The method of claim 5 wherein a plurality of coolant streams are directed the vessel at locations spaced around the periphery of the vessel.

7. The method of claim 1 wherein the material being liquefied comprises glass batch materials and the lining comprises glass batch materials.

8. The method of claim 1 wherein the vessel is rotated about a substantially vertical axis, the pulverulent material is fed at the upper end of the vessel, and the partially liquefied material is drained at the bottom portion of the vessel.

9. The method of claim 1 wherein the forced cooling is carried out intermittently.

10. Apparatus for liquefying thermally fusible material comprising:

a vessel having side walls and a bottom mounted for rotation about a substantially vertical axis and adapted to retain a pulverulent lining sloping from a relatively thin upper portion to a relatively thick lower portion, means for feeding pulverulent material into the vessel, outlet means for draining liquefied material from the vessel, means for cooling upper side wall portions of the vessel by means of circulation of cooling fluid, the means for cooling being limited to no more than one half the height of the side walls.

11. The apparatus of claim 10 wherein the cooling means include means for spraying liquid coolant against exterior surface portions of the side walls.

12. The apparatus of claim 11 wherein the cooling means comprise a plurality of spray nozzles.

13. The apparatus of claim 11 further including spray shield means defining an annular space around the exterior of side wall portions within which spraying is confined.

14. The apparatus of claim 13 wherein the shield means and spray means are provided with stationary support.

15. The apparatus of claim 14 further including liquid coolant drain means carried on the vessel.

16. The apparatus of claim 10 wherein the cooling means are associated with only the upper half of the vessel.

17. A method of liquefying thermally fusible material comprising:

feeding pulverulent batch material to a cavity encircled by a lining of pulverulent material on interior side wall portions of a vessel, the lining sloping from a relatively thin upper lining portion to a relatively thick lower lining portion;

providing heat to the cavity to liquefy exposed portions of the pulverulent material, and permitting the partially liquefied material to flow from the vessel;

protecting side wall portions of the vessel against undue thermal deterioration during major operating time periods primarily by maintaining sufficient pulverulent lining thickness to insulate the side wall portions from heat within the cavity, the pulverulent lining thickness being maintained by controlling the rate of heating and the rate of feeding additional pulverulent material; and upon aberrant reduction of thickness of portions of the pulverulent lining, protecting underlying upper vessel side wall portions against undue thermal deterioration by forced cooling of the side wall portions.

* * * * *